US012689461B2

(12) United States Patent　　(10) Patent No.:　US 12,689,461 B2

Kraft et al.　　(45) Date of Patent:　Jul. 21, 2026

(54) JAMMER RESILIENT UWB COMMUNICATION SYSTEM

(71) Applicant: NXP B.V., Eindhoven (NL)

(72) Inventors: Erik Kraft, Graz (AT); Stefan Lemsitzer, Stainz (AT); Marcel Medwed, Graz (AT); Pablo Corbalán Pelegrín, Callosa de Segura (ES); Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 190 days.

(21) Appl. No.: 18/378,064

(22) Filed: Oct. 9, 2023

(65) Prior Publication Data

US 2025/0119230 A1　Apr. 10, 2025

(51) Int. Cl.
| *H04K 3/00* | (2006.01) |
| *G06F 7/58* | (2006.01) |
| *H04B 1/7183* | (2011.01) |
| *H04B 1/719* | (2011.01) |

(52) U.S. Cl.
CPC ............... *H04K 3/86* (2013.01); *G06F 7/582* (2013.01); *H04B 1/7183* (2013.01); *H04B 1/719* (2013.01)

(58) Field of Classification Search
CPC . H04K 3/86; H04K 3/25; G06F 7/582; H04B 1/7183; H04B 1/719
See application file for complete search history.

(56) References Cited

U.S. PATENT DOCUMENTS

| 6,937,639 | B2 | 8/2005 | Pendergrass et al. |
| 8,138,975 | B2 | 3/2012 | Bull et al. |
| 8,798,221 | B1 | 8/2014 | Marsh et al. |
| 11,408,990 | B2 | 8/2022 | Casamassima et al. |
| 11,792,058 | B1 * | 10/2023 | Kim ..................... H04B 1/7176 |
|  |  |  | 375/262 |
| 2020/0336303 | A1 * | 10/2020 | Sierra ................. H04L 63/1475 |
| 2022/0276365 | A1 | 9/2022 | Yoon et al. |
| 2022/0399994 | A1 | 12/2022 | Sierra et al. |

FOREIGN PATENT DOCUMENTS

| DE | 102004013884 B4 | 4/2006 |
| EP | 4254013 A2 | 10/2023 |

OTHER PUBLICATIONS

U.S. Appl. No. 18/079,473; Title "Jammer Resilient Ranging Scheme;" Inventor: Eduardo Pimentel de Alvarenga, et al.; filed Dec. 12, 2022.

(Continued)

*Primary Examiner* — Sam K Ahn
*Assistant Examiner* — Amneet Singh

(57) ABSTRACT

A device includes a first radio controller configured to communicate using a first protocol, and a pseudo random number generator configured to generate a pseudo random output value based on an input data value. The device includes a processor configured to determine a preamble code based on an output of the pseudo random number generator, and process a data packet received using the first radio controller using the preamble code to generate a processed data packet.

19 Claims, 5 Drawing Sheets

(56) References Cited

OTHER PUBLICATIONS

"IEEE Standard for Low-Rate Wireless Networks—Amendment 1: Enhanced Ultra Wideband (UWB) Physical Layers (PHYs) and Associated Ranging Techniques," in IEEE Std 802.15.4z-2020 (Amendment to IEEE Std 802.15.4-2020) , vol., No., pp. 1-174, Aug. 25, 2020, doi: 10.1109/IEEESTD.2020.9179124.

Fira Consortium, UWB MAC Technical Requirements 2.0.0-0.7r23 (not public—members only).

Hermanns, Frank, "Cryptographic CDMA code hopping (CH-CDMA) for signal security and anti-jamming" in Proceedings EMPS 2004, Sep. 21-22, 2004, pp. 127-136, Noordwijk, Holland.

Chiang, Jerry T. et al., "Cross-Layer Jamming Detection and Mitigation in Wireless Broadcast Networks," IEEE/ACM Transactions on Networking, Feb. 2011, pp. 286-298, vol. 19, No. 1, doi: 10.1109/TNET.2010.2068576.

Mpitziopoulos, Aristides et al., "A Survey on Jamming Attacks and Countermeasures in WSNs," IEEE Communications Surveys & Tutorials, Fourth Quarter 2009, pp. 42-56, vol. 11, No. 4, doi: 10.1109/SURV.2009.090404.

Di Pietro, Roberto et al., "GopJam: Key-less Jamming Mitigation via Gossiping," Journal of Network and Computer Applications, vol. 123, pp. 57-68, 2018, doi: https://doi.org/10.1016/j.jnca.2018.08.001.

Vecchia, Davide et al., "Playing with Fire: Exploring Concurrent Transmissions in Ultra-wideband Radios," 2019 16th Annual IEEE International Conference on Sensing, Communication, and Networking (SECON), 2019, pp. 1-9, doi: 10.1109/SAHCN.2019.8824929.

* cited by examiner

JAMMER RESILIENT UWB COMMUNICATION SYSTEM

TECHNICAL FIELD

The present disclosure generally relates to systems and methods configured to implement robust ultra-wideband (UWB) communication protocols and, more specifically, to systems and methods configured to select preamble communication codes in an unpredictable manner to perform UWB communications that are resistant to communication jamming.

BACKGROUND

Radio frequency (RF)-based communication systems can be vulnerable to communication jamming attacks in which a malicious user broadcasts a signal in the communication channel to prevent or hamper communication between legitimate devices. In the case of ultra-wideband (UWB) communications, this kind of attack may be successful if the malicious signal looks like the signal expected by a receiver device and the signal reaches the receiver device with higher power than the wanted signal. For example, a low-cost, low-power jammer could continuously transmit a signal that includes the preamble sequence that a receiver device needs for signal acquisition and synchronization. In that case, there can be a relatively high probability that the receiver device will synchronize its communication functions to the jamming signal instead of the wanted signal. This can result in intended communications being blocked.

UWB can be utilized to implement localization services enabling participating devices to determine their locations or the locations of other devices through a real-time location system (RTLS) to perform various functions. For example, the location of devices may be used to provide navigation or other location-driven services. If the UWB communications utilized in implementing localization services are jammed by a malicious signal in the manner described above, the location services may become unavailable resulting in potential loss of system functionality.

SUMMARY

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

In some aspects, the techniques described herein relate to a system, including: a plurality of ultra-wideband (UWB) anchors configured to broadcast UWB timing data in a plurality of data packets, wherein each data packet is associated with a preamble code; and a device, including: a first radio controller configured to communicate with the plurality of UWB anchors using a first protocol, a pseudo random number generator configured to generate a pseudo random output value based on an input data value; and a processor configured to: provide the input data value to the pseudo random number generator to cause the pseudo random number generator to output the pseudo random output value; determine, using the pseudo random output value, a preamble code; process a data packet received using the first radio controller and from a first UWB anchor in the plurality of UWB anchors using the preamble code to generate a processed data packet; and determine a location of the device using the processed data packet.

In some aspects, the techniques described herein relate to a device, including: a first radio controller configured to communicate using a first protocol, a pseudo random number generator configured to generate a pseudo random output value based on an input data value; and a processor configured to: determine a preamble code based on an output of the pseudo random number generator; and process a data packet received using the first radio controller using the preamble code to generate a processed data packet.

In some aspects, the techniques described herein relate to a method, including: providing an input data value to a pseudo random number generator to cause the pseudo random number generator to output a pseudo random output value; determine, using the pseudo random output value as an input to a pseudo random number generator, a preamble code; processing a data packet received using a first radio controller configured to communicate using a first communication protocol using the preamble code to generate a processed data packet; and determining a location of a device using the processed data packet.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE ILLUSTRATED EMBODIMENTS

The present disclosure generally relates to systems and methods configured to implement ultra-wideband (UWB)

communication protocols and, more specifically, to systems and methods configured to modify preamble communication codes in an unpredictable manner to perform UWB communications that are resistant to communication jamming.

As described herein, UWB communications may refer to a radio technology that can use low energy levels for short-range, high-bandwidth communications over a large portion of the radio spectrum. In addition, UWB may refer to a technology for transmitting information spread over a large bandwidth (e.g., approximately 500 MHz or greater than 500 MHz). In some embodiments, UWB may be defined as wireless transmissions for which an emitted signal bandwidth exceeds the lesser of 500 MHz or 20% of the signal's arithmetic center frequency. In some embodiments, UWB communications may involve the transmission of information by generating electronic energy at a radio frequency at specific time intervals and occupying a large bandwidth, thus enabling pulse-position modulation.

An UWB location and ranging system may also employ a Time-of-Flight principle to determine the distance between a localization device, a personal communications device, and/or UWB anchors. In some embodiments, a transceiver's transmitter (associated with the localization device) sends out a waveform, commonly a chirp or a pulse, which is either reflected by an object or retransmitted by a second transceiver. Based on the amount of time it takes for the reflection or retransmission to reach the originating transceiver's receiver, the distance between the objects can be calculated. The calculated distance between the receiver and the transmitter may then be used to determine a location, such that the location may be used to perform further localization-related functions.

Figure 1:
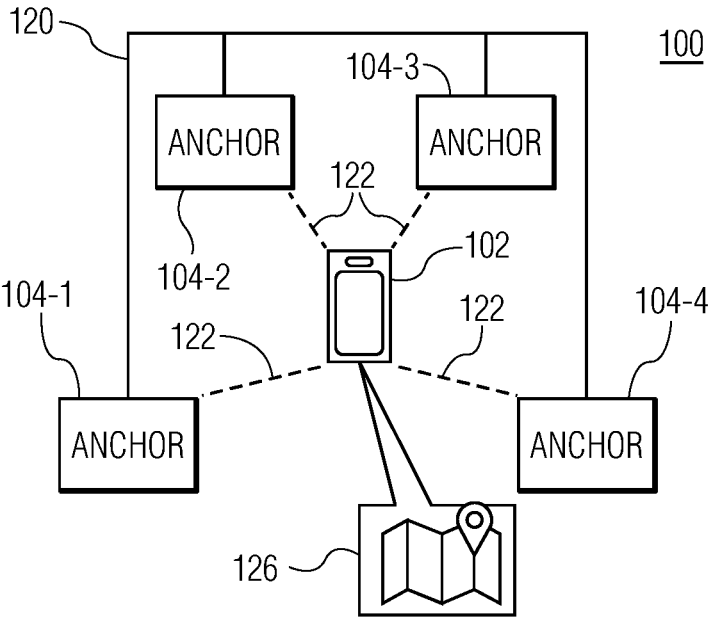
FIG. 1 depicts an example of a real-time location system (RTLS) that is used for wireless localization.

FIG. 1 depicts an example of a real-time location system (RTLS) 100 that is used for wireless localization. In the embodiment depicted in FIG. 1, the RTLS 100 includes a localization device 102 that wirelessly communicates with four UWB anchor devices (anchor 104-1, anchor 104-2, anchor 104-3, and anchor 104-4). The RTLS 100 can be used in various applications, such as industrial applications, medical applications, computer applications, and/or consumer or enterprise applications. In some embodiments, the RTLS 100 is a wireless localization system, such as a wireless localization system compatible with an Institute of Electrical and Electronics Engineers (IEEE) 802.15.4 protocol. For example, the RTLS 100 may be a wireless localization system compatible with the IEEE 802.15.4z standard. Although the RTLS 100 is shown in FIG. 1 with certain components and described with certain functionality herein, other embodiments of the RTLS 100 may include fewer or more components to implement the same, less, or more functionality. In another example, although the RTLS is shown in FIG. 1 as being connected in a certain topology, the network topology of the RTLS is not limited to the topology shown in FIG. 1.

In the embodiment depicted in FIG. 1, the localization device 102 may be a mobile device (e.g., phone, smartwatch, tablet, laptop, etc.). In addition, the localization device 102 may be a UWB enabled device, such that a UWB radio and a localization engine are implemented in the localization device 102. The UWB radio and/or the localization engine of the localization device 102 may be implemented in hardware (e.g., circuits), software, firmware, or a combination thereof. The UWB radio and/or the localization engine of the localization device 102 may be fully or partially implemented as an integrated circuit (IC) device. In some embodiments, the UWB radio and/or the localization engine may be compatible with at least one UWB wireless protocol (e.g., at least one IEEE 802.15.4 protocol). For example, the UWB radio and/or the localization engine may be compatible with the IEEE 802.15.4z protocol.

In some embodiments, the UWB radio is a wireless UWB radio that wirelessly connects to UWB anchors, for example, through one or more UWB wireless protocols, such as the IEEE 802.15.4 protocol. In some embodiments, the UWB radio includes at least one antenna, at least one transceiver operably connected to the at least one antenna, and at least one processor operably connected to the corresponding transceiver. In some embodiments, the at least one transceiver includes a physical layer (PHY) device. The at least one processor may be configured to control the at least one transceiver to process received packets (e.g., blink packets) through the at least one antenna. In some embodiments, the at least one processor is implemented within a processor, such as a microcontroller (MCU), a host processor, a host, a digital signal processor (DSP), or a central processing unit (CPU), which can be integrated in a corresponding transceiver.

In the embodiment depicted in FIG. 1, the UWB anchors (e.g., anchor 104-1, anchor 104-2, anchor 104-3, and anchor 104-4) can be associated with (e.g., connected to) a localization device (e.g., localization device 102) and that may communicate with the localization device via UWB communications. Although the RTLS 100 is shown in FIG. 1 as including four anchors, other embodiments of the RTLS may include three anchors or more than four anchors. In addition, a UWB anchor may be a unidirectional communication device or a bidirectional communication device. In such an embodiment, the UWB anchors (e.g., anchor 104-1, anchor 104-2, anchor 104-3, and anchor 104-4) may each be connected via a network 120. The network 120 may involve each of the UWB anchors in the RTLS 100 being connected through, for example, ethernet and/or Wi-Fi to enable anchor synchronization. Alternatively, anchor synchronization may occur using in-band UWB communications between anchor devices. Anchor synchronization allows the RTLS 100 to exchange time-specific data (e.g., UWB timing data) which may further be used to provide an accurate, real-time location of the localization device 102. In such an embodiment, the UWB anchors may be connected (e.g., wirelessly connected) to the UWB radio of the localization device 102 using a UWB wireless protocol (illustrated by dashed lines 122), such that the UWB radio may obtain UWB timing data via at least one blink packet transmitted by each of the UWB anchors using the UWB wireless protocol. For example, each of the UWB anchors may transmit a blink packet that includes information corresponding to the respective UWB anchor.

With reference to FIG. 1, the localization device 102 may perform each of the functionalities needed for wireless localization in RTLS 100. For example, the UWB radio of the localization device may obtain UWB timing data from the UWB anchors, the localization engine may use the UWB timing data to determine the location of the localization device 102, and the location of the localization device 102 may be used by the localization device, e.g., to display the location of the localization device via a UI (shown by mapping image 126) or to determine a function to be performed. In such an embodiment, the localization device 102 determines its own location using UWB communications and UWB timing data that the localization device captures from the UWB anchors. Consequently, when the localization device lacks one or more of the functionalities needed for wireless localization, the RTLS may be unable to perform wireless localization. In addition, because a localization device may lack UWB capability, computing power, and/or a UI, it may not be possible to implement each of the functionalities using a single device.

Many RF communication systems are vulnerable to communication jamming attacks in which a malicious user introduces a signal in the communication channel to prevent or hamper communication between legitimate devices. In the case of UWB communications, this kind of attack can be successful if the jamming signal looks like the signal expected by the receiver (i.e., the desired signal) and reaches the attacked receiver with higher power than the desired signal. For example, a low-cost, low-power jamming device could continuously transmit the sequence that a receiver requires for signal acquisition and synchronization. Then, there is a high probability that a victim device near the jamming device will synchronize with the jamming device's jamming signal instead of the desired signal, blocking intended communications.

In a specific example of signal jamming, specific jamming device placements can completely disrupt localization service (e.g., a denial of service attack) in certain UWB localization systems. This may be particularly true if the jamming signal reaches several listening nodes (e.g., localization device 102 of FIG. 1) with a higher power than a genuine signal. In that case, the jamming signal can create large geographical regions (referred to as "shadow zones") where no localization services can operate.

To mitigate these potential problems that can result from jamming activities in a UWB communication system, the present disclosure provides a mitigation approach that substantially increases the difficulty of such jamming attacks. Consequently, the present disclosure provides systems and methods for communication systems that can increase the availability of UWB systems used in critical applications, such as localization servers that may include secure ranging services.

UWB communication systems rely on a preliminary network configuration step that enables participating devices to obtain the necessary device configuration parameters to operate on the UWB network. Typically, these configuration parameters are exchanged by an out-of-band communication channel (i.e., a communication channel that is not part of the UWB network that is being configured or setup).

Among the configuration parameters that are exchanged as part of this preliminary setup step are the selected frequency channel (e.g., Channel 9) and preamble code(s). Correct setup of these parameters ensures that different UWB systems can co-exist in the vicinity of each other without unwanted disturbances. After configuration parameter setup, for example, unused preamble codes with low cross-correlation are available in the set of available preamble codes and can be used to increase communication resilience against communication interference. The present system is configured to use these unused preamble codes to improve the UWB system's resistance against preamble-repeating jammers, as described herein.

Specifically, participant devices in the network are configured to pseudo-randomly change the preamble code for packet transmissions occurring on the UWB network so that an attacker cannot deterministically predict the preamble code that will be used for a future packet transmission. This operation can make it difficult for the attacker to transmit a jamming signal that incorporates the correct preamble code thereby reducing the success probability of such an attack.

Within a UWB system, each participating UWB node device (e.g., one or more of localization device 102 or anchors 104 of FIG. 1) contains a secure deterministic pseudo-random number generator (PRNG) that generates numbers based on an initial seed value (e.g., a cryptographic PRNG). The outputs of such PRNGs are used for the needed pseudo-random selection of network preamble codes.

In order to properly configure the device (e.g., to establish a shared initial seed value for the device's PRNGs), configuration data for the participating devices is exchanged over a secure and not-jammed out-of-band network. Additional data, such as the current preamble hopping state can also be transmitted over this channel.

Figure 2:
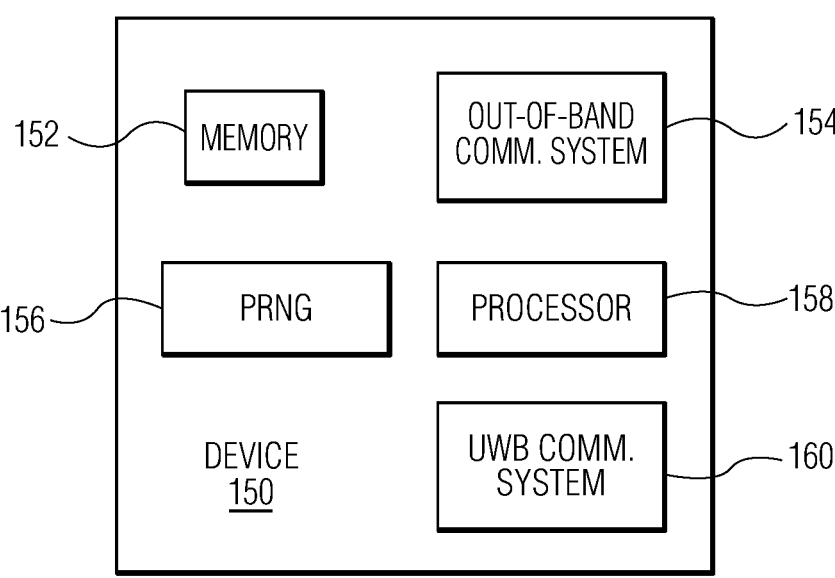
FIG. 2 depicts a device configured to implement the preamble selection scheme of the present disclosure.

FIG. 2 depicts a device 150 (e.g., localization device 102 or anchors 104 of FIG. 1) configured to implement the preamble selection scheme of the present disclosure. Device 150 includes a memory 152 (e.g., a temporary storage memory or a permanent storage memory) configured to store configuration parameters for participation in a UWB network. The parameters may include, as described herein, shared seed data, which enables processor 158 of device 150 to determine an index of a preamble code to be utilized for a next communication occurring in the UWB network. In an embodiment, device 150 is configured to receive the network configuration parameters via an out-of-band communication channel using out-of-band communication system 154. Out-of-band communication system 154 may include a radio controller configured to communicate, using a non-UWB communication channel, with a network controller configured to provide those network parameters.

In an embodiment, the parameters stored in memory 152 further enable processor 158 of device 150 to configure PRNG 156 to generate a predictable (but random) set of index numbers that the device 150, as described herein, can use to determine a current preamble code that is in use by the network. Processor 158 can then use the corresponding preamble code (e.g., retrieved from memory 152) when processing communications either transmitted or received by UWB communication system 160.

In UWB communication systems, at any time there are sufficient unused preamble codes with low cross-correlation to enable desired levels of resilience against preamble-repeating jammers. Typically, the number of unused codes will be determined by the applicable communications standard and number and configuration of co-existing and overlapping individual UWB networks. In some embodiments, it may be the case that the co-existence of UWB networks that use the same preamble code set can be achieved. In that case, by pseudo-randomly hopping preamble codes, a conflict is unlikely if the preamble code set is sufficiently large. Therefore, multiple networks using the same preamble code set could operate in the vicinity of each other with a lower probability of interfering in accordance with the present disclosure.

In a specific example of the present system and method, a UWB system is configured to execute a downlink time difference of arrival (DL-TDoA) localization protocol. In this protocol, a fixed number of pre-mounted nodes, typically called anchors (e.g., anchors 104 of FIG. 1), provide localization support to an unknown number of moving nodes called mobiles or tags (e.g., localization device 102 of FIG. 1).

In that protocol, after the initial configuration/setup phase, the various nodes transmit the following message sequence periodically based on a time schedule: 1) an initiator node sends a ranging initiation message (RIM), 2) responder nodes receive RIM message and reply in a sequence with ranging response messages (RRMs), and 3) the initiator device optionally sends a ranging final message (RFM).

Figure 3:
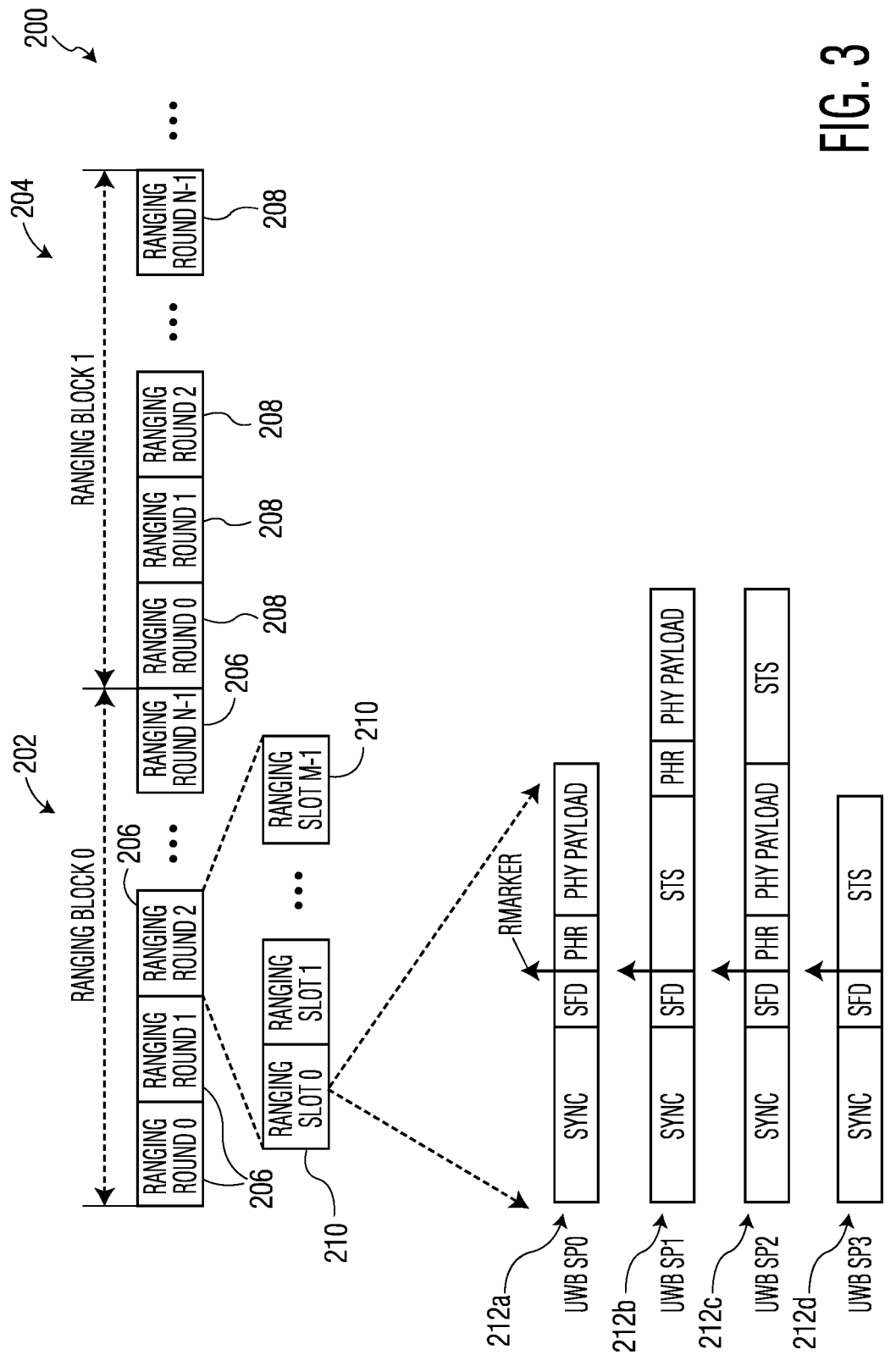
FIG. 3 depicts the subdivision of a timeline for UWB communications broken down into blocks, rounds, and slots.

Within the network, mobile nodes listen to all transmitted messages and use the information received together with the measured receive (RX) timestamps to locate themselves. To schedule transmissions of the messages, time is divided into units of blocks, rounds, and slots. To illustrate, FIG. 3 depicts the subdivision of a timeline for UWB communication broken down into blocks, rounds, and slots. Specifically, timeline 200 shows two ranging blocks 202 and 204. Each ranging block is broken down into a number of ranging rounds 206 and 208. Additionally, each round 206, 208 is broken down or subdivided into a number of smaller time slots 210.

The setup ranging block 202, 204 is repeated periodically. Within the network, all participating nodes are configured with specified block 202, 204, round 206, 208, and slot 210 durations to be able to schedule message transmission and reception operations.

Within a slot 210, it is generally possible to execute at least one message transmission or reception. In a typical configuration, a DL-TDoA ranging round contains at least as many slots as there are anchor devices to allow the undisturbed transmission of all involved messages. This enables, for each ranging round 206, transmission of an initial RIM packet, the responsive RRM message packets, and the final RFM packet. In accordance with various standards and protocols, the data packets transmitted within each slot 210 may be encoded in various different formats. Within FIG. 3, for example, a slot transmission may be encoded according to any of the formats 212a, 212b, 212c, and 212d. As depicted, each packet encoding can include a payload (e.g., PHY PAYLOAD), which may appear in different locations in each packet. All packets 212 are similar, however, in that they each begin with a synchronization header (SYNC) that includes the preamble sequence and SFD. The present disclosure involves carefully selecting the preamble code that is used to construct the SYNC portion of a UWB data packet.

The SYNC portion of a packet contains N repetitions of a spread preamble code standardized by an applicable communications standard. The preamble code specifies a sequence of positive, negative, or absence of UWB pulses to be transmitted. The SYNC field contains N repetitions of the spread code sequence, e.g., a 32-symbol preamble or SYNC field contains the spread preamble code repeated 32 times. After the SYNC portion, the packets contain the start of frame delimiter (SFD), which delimits the beginning of the packet after the synchronization header (SHR). Afterwards, the packet may optionally include an STS sequence, which contains a pseudorandom sequence of pulses used for secure ranging. The PHR block is the PHY Header and indicates some properties of the signal and the length of the PSDU. Finally, in the PSDU we include the MAC Header and the rest of the payload, e.g., including some additional data.

In configuring a transmission for a particular slot 210 to use a particular preamble code, the useable preamble code space may be defined as P, where $N_p$ represents the number of available preamble codes:

$$P = \{P_0, P_1, \ldots, P_{Np-1}\} \quad P_i \in \mathbb{N} \quad (1)$$

The value $N_{Rounds}$ is defined as the number of ranging rounds withing a ranging block. $N_{Ranging\ Slots}$ is defined as the number of slots within a ranging round. Preamble hopping state s is a counter that is increased after every slot. The preamble hopping state s can be translated to a corresponding slot index $i_S$, ranging round index $i_R$ and ranging block index $i_B$ in the message scheduling pattern:

$$i_S = s \bmod N_{Ranging\ Slots} \quad (2)$$

$$i_R = \left\lfloor \frac{s}{N_{Ranging\ Slots}} \right\rfloor \bmod N_{Rounds} \quad (3)$$

$$i_B = \left\lfloor \frac{s}{N_{Rounds} \cdot N_{Ranging\ Slots}} \right\rfloor \quad (4)$$

A node participating in the network has knowledge (due to the initial network setup/configuration step (e.g., occurring via out-of-band communication system 154 of device 150 of FIG. 2) of the values $N_{Rounds}$ and $N_{Ranging\ Slots}$. Consequently, the node can determine the $(i_S, i_R, i_B)$ tuple for the node's next scheduled transmission. The node can therefore use the tuple for determining the preamble hopping state s at the next transmission according to the following expression:

$$s(i_S, i_R, i_B) = i_S + i_R \cdot N_{Ranging\ Slots} + i_B \cdot N_{Rounds} \cdot N_{Ranging\ Slots} \quad (5)$$

With knowledge of the preamble hopping state s at the next transmission, the node can derive the corresponding preamble code selector p. $r_{index}$ denotes the integer drawn from a pseudorandom number generator (PRNG) (e.g., PRNG 156 of FIG. 2) at invocation index, as follows.

$$p(i_S, i_R, i_B) = r_{s(i_S,i_R,i_B)} \bmod |P| \quad (6)$$

With these values determined, the node can determine the preamble code for the next transmission as $P_p(i_S,i_R,i_B) \in P$.

As described above, the output of the PRNG is split up so that every slot is assigned its own pseudo-random preamble code. All devices (e.g., device 150 FIG. 2) participating in the UWB network have similarly configured PRNGs such that for a particular preamble hopping state s as input, each device's PRNG generates the same output indicative of the same preamble code. Accordingly, assuming the various devices participating in the network have knowledge of the same preamble hopping state s, the devices can identify the same preamble code at the same time, enabling successful communications via the network.

Note that fetching a preamble code for a specific $(i_S, i_R, i_B)$ tuple can be effective with a PRNG that allows easy modification of the generator's internal state. In that case, the state information can be shared with all network participants (e.g., via the out-of-band communication channel) to ensure that all devices' PRNG are configured to generate the same output given particular input values. An example of such a PRNG is the AES-based PRNG described in the IEEE Std 802.15.4z-2020 standard (used for STS generation), which fulfils this property.

Figure 4:
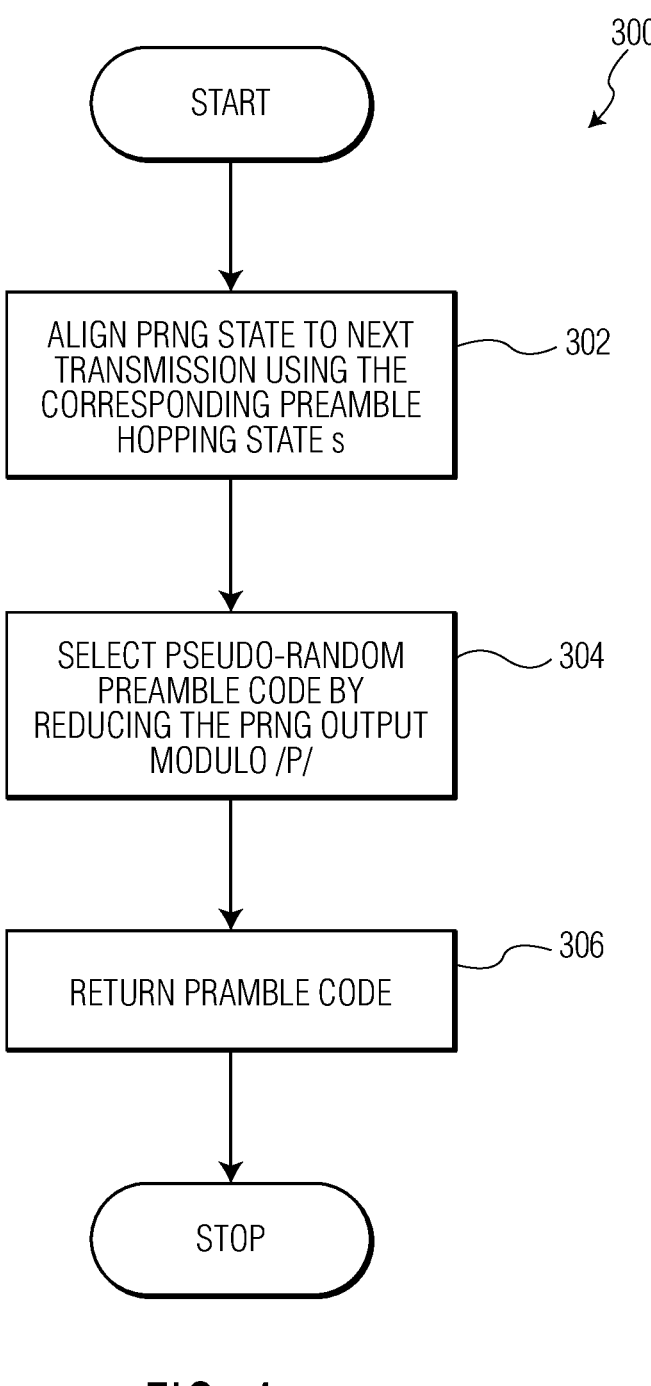
FIG. 4 is a flowchart depicting a method for performing preamble code selection in accordance with the present disclosure.

To illustrate this approach, FIG. 4 is a flowchart depicting method 300 for performing preamble code selection in accordance with the present disclosure. The method may be performed by one or more devices (e.g., device 150 of FIG. 2) participating in a UWB network.

In an initial step 302 of method 300, after the device is properly configured to communicate with the network (e.g., via the out-of-band transmission of various network and PRNG configuration parameters) the device is configured to determine a value of the current preamble hopping state s to align the device's PRNG (e.g., PRNG 156 of FIG. 2) state for the device's next data transmission.

With the PRNG configured, in step 304 a pseudo-random preamble is selected out of the properly configured PRNG. That output is then reduced by modulo |P| (see expression (6), above). This output value enables the device to determine a corresponding preamble code. Accordingly, in step 306, a preamble code can be generated based upon the PRNG output (e.g., in accordance with expression (6), above).

In this arrangement, the necessarily shared PRNG seed value for instantiating the PRNG can be exchanged during the configuration of the participating devices via the secure out-of-band network communications (e.g., via initial network setup or configuration) or may be derived by the participating devices from an otherwise provisioned shared secret. In some cases, for example, the participating devices receive the current preamble hopping state s alongside the rest of the configuration data during initial setup and configuration. The knowledge of the shared seed, the network scheduling parameters (e.g., size and duration of the various network blocks, rounds, and slots), the preamble code set P, and the preamble hopping state s allows devices that join the UWB system at any time (e.g., mobile devices) to recover a valid PRNG state and join the message exchange quickly. Such devices are configured to add an offset to the received preamble hopping state s to accommodate for their needed setup time until they can start receiving messages. Note that rotating the initial seed from time to time can further improve the offered security level. For example, this renders time-consuming attacks which leak the initial seed impractical.

In a particular network, assuming there are five useable preamble codes (P0-P4), the corresponding pseudo-random preamble code sequences in a DL-TDoA exchange (e.g., the network shown in FIG. 1) might be as shown in Table 1, below.

TABLE 1

| Slot 0 (RIM) | P3, P0, P0, P4, P2, P0, P1, P2, P3, P3, . . . |
| Slot 1 (RRM1) | P2, P0, P2, P4, P2, P2, P3, P3, P3, P1, . . . |
| Slot 2 (RRM2) | P4, P0, P0, P3, P1, P0, P4, P3, P0, . . . |
| Slot 3 (RRM3) | P2, P1, P0, P0, P0, P3, P2, P1, P0, P4, . . . |
| Slot 4 (RFM) | P2, P1, P4, P1, P2, P0, P1, P4, P0, P3, . . . |

Hence, an attacker can only guess which preamble code might be used in the future, which reduces the likelihood of successfully jamming a transmission.

During network operations, a ranging round (during which ranging data is exchanged via wireless data transmission) begins with an initial RIM message received by all participating devices except its originating device (initiator). In the present implementation, the current preamble hopping state s is added to or encoded into the RIM message to help resynchronize the preamble codes across all participating nodes. All nodes can use this received state s and compare the state s with that node's local state to confirm whether the node's generated preamble codes are still in sync and, if not, the node can use the received state s to restore a valid PRNG state.

In situations in which a node fails to receive a valid RIM message and that particular ranging round times out, either because of a jammer or poor channel conditions (e.g., obstacles, noise . . . ), it may be necessary for the node to fetch a set of preamble codes that will be used in future round transmissions. The present disclosure provides methods to perform preamble code resynchronization per device depending on the state of the affected device (e.g., synchronized to the transmission schedule or not).

Specifically, when a device is synchronized to a transmission schedule for a particular network, but that device has not received a recent RIM transmission that encodes a preamble hopping state s value, an approach is presented that uses in-band messages to enable the device's PRNG to stay synchronized and exploits that the affected device is still synchronized to the transmission schedule to determine an upcoming message preamble value. Specifically, if RIM reception times out for a particular round, there may be sufficient time to fetch the preamble codes of the next round and set up the receiving device (i.e., by configuring the nodes' PRNG) again. Then, if the next round also times out and RIM reception fails (e.g., because of bad channel conditions or an advanced attacker), this process can be continued until all unique preamble codes have been tried once, or a retry threshold was surpassed. These conditions indicate a severe state divergence, bad channel conditions, or an attacker that is jamming all or nearly all preamble codes. Alternatively, or additionally, the last successful RIM reception may be sufficiently stale that the time-based scheduling cannot be upheld because of clock synchronization issues. In any of these cases, the device then falls back to a method that enables the device to perform resynchronization without receipt (or recent receipt) of a RIM.

In that case, the device selects a preamble code and waits some time for a successful message reception to synchronize the preamble codes. How this preamble code is selected depends on the capabilities of the UWB network-specifically whether an unjammed, secure out-of-band communication channel is available.

If such an unjammed, secure out-of-band communication channel is available, the channel can be used to periodically broadcast the current preamble hopping state s or send the preamble hopping state s upon a device's request. A device can then use this state to determine a preamble code that should be used for a RIM transmission in the near future. The affected device then performs a timed wait for this message. Should the reception time out, the device can again use the preamble hopping state s to determine a different preamble code used in the near future, as the previous one was likely jammed. If there is no option for an untried preamble code in the near future, then the least-recently-used near-future preamble code can be retried. If all unique preamble codes have been tried, then the state is reset and the process restarts.

As an in-band extension or alternative in case no such out-of-band channel is available, the node may be configured to wait for the reception of a subsequent RIM but may also exploit unused slots in scheduling to introduce additional dedicated ranging synchronization messages (RSMs).

The pseudo-random selection of preamble codes can have a disadvantage in that the time until the transmission of a certain preamble code is probabilistic. Hence, also the time needed for preamble code resynchronization is probabilistic. For this reason, dedicated synchronization messages may incorporate the current preamble hopping state s and can directly be used for preamble code resynchronization between participating nodes.

Different schemes may be utilized for selecting the preamble codes used for RSM transmission. In the first scheme, the initiator transmits the RSM using a pre-configured preamble code, which allows new nodes to join the UWB network quickly in case no jammer device is present. In the second scheme, the initiator transmits the RSM with preamble codes following a sequence that consists of pseudorandomly selected permutations of the preamble code space. This approach has the advantage that all unique preamble codes are used in one sequence periodically, just in different orders. Hence, this type of RSM transmission can lead to a deterministic resynchronization time (i.e., a node waiting for $2 \cdot |P|$ transmissions of an RSM should see every preamble code at least once). The needed pseudo-random permutations can be efficiently generated on the fly using algorithms like the Fisher-Yates shuffle.

In various embodiments, a UWB network can use both schemes by transmitting the resulting RSMs in different slots (e.g., slots 210 of FIG. 3). A node performing resynchronization in such a network first selects the pre-configured preamble code if available and then waits for a RIM or RSM reception until a timeout. If a timeout occurs, then the node pseudo-randomly selects a preamble code and waits again for the reception. This process can be repeated in circumstances involving further timeouts until a message is received and preamble code resynchronization can be performed.

Once successful, the preamble code generation process described above for a synchronized node is tried first for the next failing RIM reception. In this method nodes may decide to stop or pause this approach after a certain number of failed attempts to save energy. The RSMs using a fixed preamble code can be implemented by adding the preamble hopping state s to the existing pre-poll message (RCM) in existing two-way ranging protocols. For the DL-TDoA protocol, for example, a similar pre-RIM data message could be added before the RIM transmission.

In general, all participating nodes, except for the initiator (because the initiator is responsible for transmitting RIM and RSM messages and, therefore, is responsible for determining the current preamble hopping state), can use the preamble code generation process for unsynchronized nodes until they receive at least one valid RIM.

Figure 5:
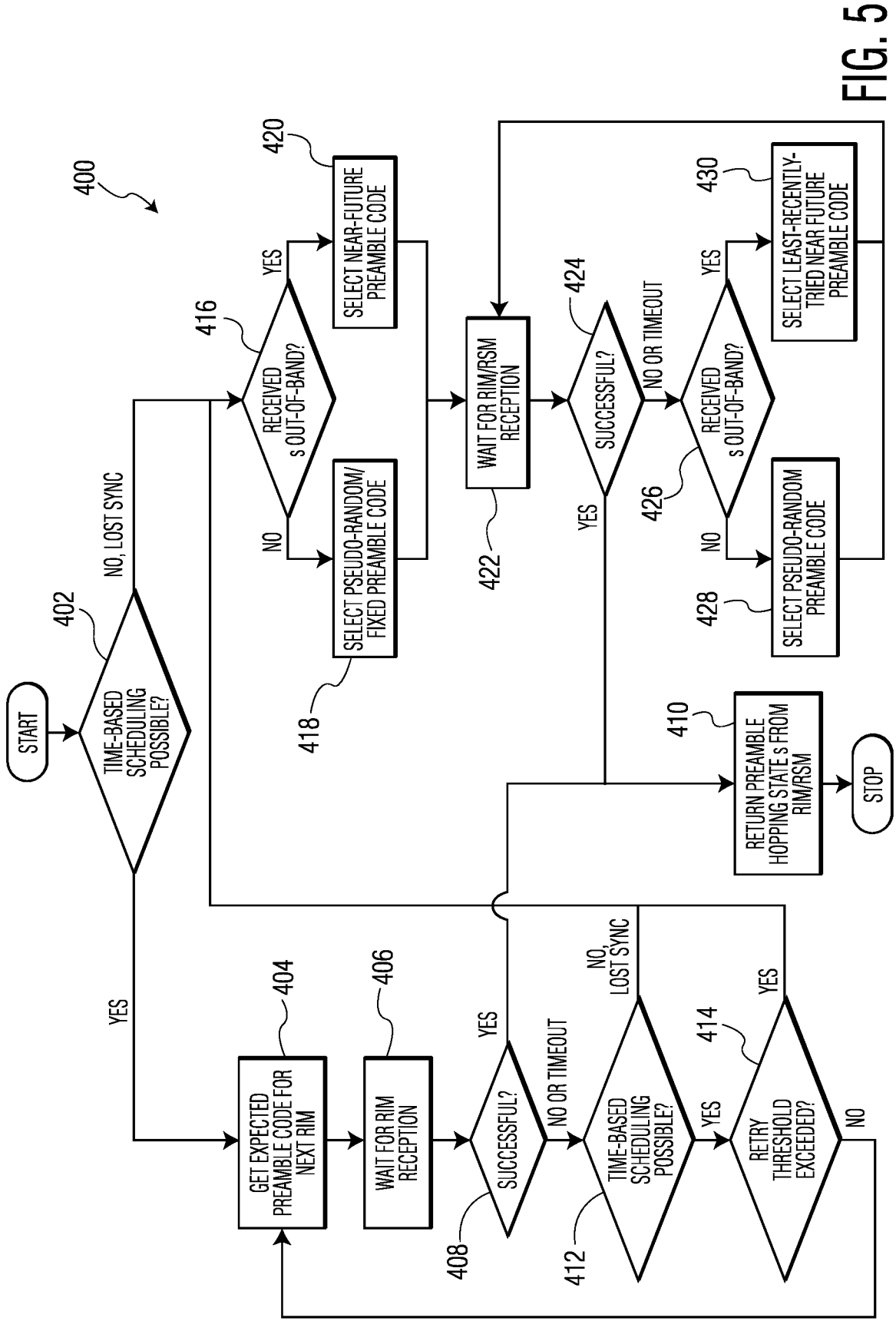
FIG. 5 is a flowchart depicting a method for a device participating in UWB communications to determine a current preamble hopping state for future communications during a communication slot.

FIG. 5 is a flowchart depicting a method 400 for a device (e.g., device 150 of FIG. 2) participating in UWB communications network to determine the current preamble hopping state needed for future communications during a communication slot. Method 400 is implemented by a participating device, such as one or more of anchors 104 or device 102 of FIG. 1 or device 150 of FIG. 2.

In step 402, the device determines whether the device is currently synced with the UWB network such that a time-based determination of upcoming preamble is possible. This may involve the device determining whether the device has had recent successful communications with the network (indicating that the device is time synchronized) or if the device has not successfully communicated with the network for an extended period of time (indicating that the device is not time-synchronized).

If the device is time synchronized, the device may be capable of determining the preamble code for an upcoming slot algorithmically. Accordingly, in step 404, the device determines, according to a previously exchanged selection algorithm and criteria, the preamble code for the next message to occur in the next RIM communication slot (e.g., slot 210 of FIG. 3). This may involve, for example, the device independently setting the preamble hopping state s to a value associated with a particular upcoming slot. Based on the preamble hopping state s, the device can then operate the device's PRNG to determine the preamble code associated with that preamble hopping state s. In step 406, with a preamble code determined, the device waits to receive a RIM message, and in step 408 determines whether the received RIM message is successfully received and decoded using the preamble code as determined in step 404. If the RIM message is successfully received and decoded, the method proceeds to step 410 and returns the preamble hopping state s as determined from the received RIM message.

If, however, in step 408 the RIM message was not successfully received, the method proceeds to step 412 in which the device determines whether it is possible to perform time-based scheduling in which the device attempts to determine the preamble code for an upcoming RIM transmission. If that is not possible (e.g., the device has lost time synchronization with the network while executing steps 404, 406, and 408), the method proceeds to step 416 in which the device executes an alternative approach for determining preamble codes that does not require the device to be time synchronized with the network.

If time-based scheduling is possible (step 412) and a retry threshold (e.g., a predetermined number of times that the loop including steps 404, 406, 408, 412, and 414 has been executed consecutively) has not been exceeded (step 414), the method returns to step 404 and the device determines another preamble code and again attempts successful reception of an upcoming RIM message using the determined preamble code.

Accordingly, returning to step 402, if the device determines that time-based scheduling or determination of preamble codes is not possible, the method proceeds to step 416 in which the device determines whether it has previously received (e.g., via an out-of-band communication channel) a preamble hopping state s. If not, and the device has no knowledge of the current preamble hopping state, in step 418 the device selects a preamble that is either determined pseudo randomly or is a predetermined fixed value. In this case, the device may be required to select a preamble and then wait (potentially for a significant amount time) until the device receives a transmission that is successfully decoded using the selected preamble. At that time the device can be resynchronized with the network.

In this step 418, a pseudo-random or predetermined (i.e., fixed) preamble code is selected. Some networks may be configured to periodically transmit resynchronization messages (e.g., RSMs) (e.g., one RSM every N blocks) that facilitate a device being quickly resynchronized with the network. In that case, the RSMs may be encoded using a subset of available preambles (i.e., from which the pseudo-random preamble code is selected) such that fewer RSMs must be received by the device before a pseudo randomly chosen preamble out of the subset successfully decodes an RSM. Alternatively, RSMs may be encoded such that all $N_p$ preamble codes must be used before a preamble code can be repeated. In that case, a device that randomly selects a preamble code out of the $N_p$ available preamble codes in step 418, will only need to wait (in a worst-case scenario) for $N_p$ RSMs before being guaranteed that an RSM can be successfully received and decoded using the selected preamble code. In this case it might take up to "$2*N_p$" RSMs until resynchronization is completed. For example, if the following RSM preamble sequence (4 preambles exist) is utilized, the unsynchronized node waits for preamble code P1 and starts listening shortly after the beginning of the first transmission of P1:

P1, P2, P3, P4, P2, P4, P3, P1
 1 2 3 4 5 6 7 8

In this case it would take 8 time steps $(2*N_p)$ until resynchronization is complete. In another embodiment, different types of RSMs may be transmitted in different blocks. For example, every N blocks two RSMs could be transmitted, the first with a fixed preamble helping with fast resynchronization and the second with a subset of the available preambles where resynchronization takes longer but can provide higher resilience against jammers.

If, however, the device knows the current preamble hopping state, in step 420 the device is configured to select a near-future preamble code based upon the current preamble hopping state s. A near-future preamble code may be a preamble code likely to be used by the network in a later occurrence of a subsequent time slot—that is, in the next N (e.g., 10, 15, or more) time slots. The idea is that because the device is not time synchronized the device cannot determine a preamble code for the immediately 'next' slot, because that slot may have already passed or may not actually occur for some time. Accordingly, the device will select a preamble code that the device anticipates the network using in the next N timeslots (i.e., the "near future"). The device can then receive sequential network transmissions and use that preamble code to attempt to decode each subsequent transmission. Eventually, a transmission will be successfully decoded using the selected preamble.

With a preamble determined in either step 418 or step 420, in step 422 the device waits to receive a RIM (or RSM) message, and in step 424 determines whether the received RIM (or RSM) message is successfully received and decoded using the preamble code as determined in either step 418 or step 420. If the RIM (or RSM) message is successfully received, the method proceeds to step 410 and returns the preamble hopping state s as determined from the received RIM (or RSM) message.

If, however, in step 424 the RIM (or RSM) message was not successfully received, the method proceeds to step 426 in which the device determines whether it has received a preamble hopping state s via an out-of-band communication (e.g., whether the device has ever been synchronized or successfully connected to the network). If not, the device selects a pseudo-random preamble code in step 428, if so, the device selects a least-recently-tried near-future preamble code in step 430 (i.e., a different preamble code than one selected previously in step 420). With a preamble selected in either step 428 or step 430, the method returns to step 424 and the device waits to receive and process a RIM (or RSM) message using the new preamble code. The device continues executing the control loop of steps 424, 426, and 428 or 430 until the device selects a preamble message (e.g., in any of steps 418, 420, 428, and/or 430) that enables the device to successfully receive and decode a RIM (or RSM) message, which indicates that the device is now synchronized and configured for ongoing communications with the network.

Figure 6:
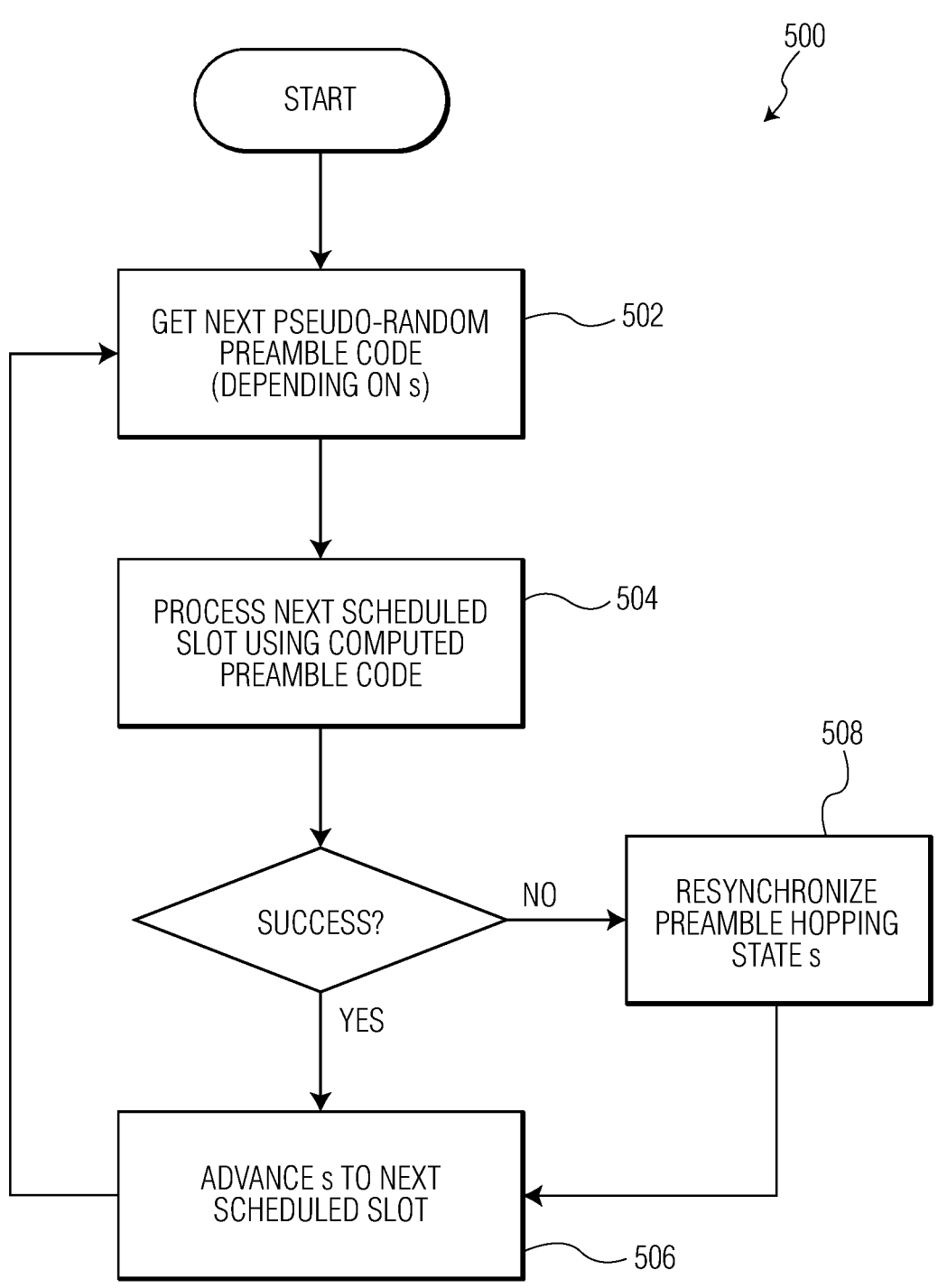
FIG. 6 is a flowchart depicting a method that may be implemented by a device participating in a UWB network in accordance with the present disclosure.

FIG. 6 is a flowchart depicting a method 500 that may be implemented by a device participating in a UWB network in accordance with the present disclosure. In an initial step 502, the device (e.g., device 150 of FIG. 2) is configured to determine a preamble code that will be used in the next network communication timeslot. As described above, this may be performed by providing a current preamble hopping state s as an input into a PRNG (i.e., the preamble hopping state s is equal to the input data value to the PRNG). The output of the PRNG is then mapped to a particular preamble code index, which is associated with a specific preamble code. In step 504, the device is configured to process communications occurring in the next communication timeslot using the preamble code that was previously determined in step 502. If a message received in the timeslot is successfully received and decoded using the selected preamble code, the method moves on to step 506 in which the device is configured to increment the preamble hopping state s and return to step 502 to determine the preamble code for the next time slot. However, if the message was not successfully received, the method moves to 508 in which the device is configured to resynchronize the preamble hopping state s. This step may be achieved, for example, by the device performing method 400 of FIG. 5, as described above.

In some embodiments of the present system and method, computational overhead may be somewhat reduced by performing a preamble selection routine in which preambles are only changed every ranging round (e.g., ranging rounds 206, 208 of FIG. 2) instead of every slot (e.g., slots 210 of FIG. 1).

In some UWB network implementations, an attacker with knowledge of the preamble selection protocol syntax and timing may be able to construct packets that can be injected into the network communications from time to time due to the limited entropy of the network's preamble code space. In this case, cryptographic protection of the exchanged packets may be required to detect active jamming and mitigate the injection of crafted preamble hopping state values that could reduce the system's availability even with our invention applied.

The present preamble selection approach may be incorporated into other communication networks/protocols that use preamble codes, such as existing code-division multiple access (CDMA) schemes, to increase the channel throughput and coexistence between different collocated UWB networks. Exploiting the low cross-correlation between the pseudo-random preamble codes of different slots can allow the co-existence of multiple UWB networks using the same preamble code set. Some embodiments involve tracking preamble codes used in an active communication jamming attack and excluding those preamble codes from the preamble code selection process if the remaining entropy in the remaining preamble codes is still high enough to avoid failing localization rounds and increase real-time guarantees.

Clause 1. A system, comprising: a plurality of ultra-wideband (UWB) anchors configured to broadcast UWB timing data in a plurality of data packets, wherein each data packet is associated with a preamble code; and a device, including: a first radio controller configured to communicate with the plurality of UWB anchors using a first protocol, a pseudo random number generator configured to generate a pseudo random output value based on an input data value; and a processor configured to: provide the input data value to the pseudo random number generator to cause the pseudo random number generator to output the pseudo random output value; determine, using the pseudo random output value, a preamble code; process a data packet received using the first radio controller and from a first UWB anchor in the plurality of UWB anchors using the preamble code to generate a processed data packet; and determine a location of the device using the processed data packet.

Clause 2. The system of clause 1, wherein the device includes a second radio controller configured to communicate using a second protocol, wherein the second protocol is not a UWB communication protocol.

Clause 3. The system of clause 2, wherein the processor is configured to receive, using the second radio controller, a first configuration parameter, wherein the first configuration parameter indicates a mapping of pseudo random output values of the pseudo random number generator to preamble codes.

Clause 4. The system of clause 3, wherein the processor is configured to receive, using the second radio controller, a second configuration parameter, wherein the second configuration parameter determines a configuration of the pseudo random number generator.

Clause 5. The system of clause 1, wherein the processor is configured to determine a current preamble hopping state value and the preamble hopping state value is equal to the input data value to the pseudo random number generator.

Clause 6. The system of clause 5, wherein the first protocol subdivides communication operations into a plurality of sequential time slots and the processor is configured to increment the preamble hopping state value upon an occurrence of each subsequent time slot.

Clause 7. The system of clause 1, wherein when the device is not time synchronized to the plurality of UWB anchors the processor is configured to: determine a first preamble code out of a plurality of preamble codes, wherein the plurality of preamble codes are determined by the first protocol; repeatedly use the first preamble code to attempt to decode ranging initiation messages or ranging synchronization messages received from the plurality of UWB anchors; and upon successfully using the first preamble to decode a first ranging initiation message or ranging synchronization message, determine a current preamble hopping state value of the plurality of UWB anchors.

Clause 8. The system of clause 7, wherein the first preamble code is a fixed value.

Clause 9. The system of clause 7, wherein the first preamble code is determined pseudo randomly.

Clause 10. A device, comprising: a first radio controller configured to communicate using a first protocol, a pseudo random number generator configured to generate a pseudo random output value based on an input data value; and a processor configured to: determine a preamble code based on an output of the pseudo random number generator; and process a data packet received using the first radio controller using the preamble code to generate a processed data packet.

Clause 11. The device of clause 10, wherein the device includes a second radio controller configured to communicate using a second protocol.

Clause 12. The device of clause 11, wherein the processor is configured to receive, using the second radio controller, a configuration parameter, that determines a configuration of the pseudo random number generator.

Clause 13. The device of clause 10, wherein the processor is configured to determine a current preamble hopping state value and the preamble hopping state value is equal to the input data value to the pseudo random number generator.

Clause 14. The device of clause 13, wherein the first protocol subdivides communication operations into a plurality of sequential time slots and the processor is configured to increment the preamble hopping state value upon an occurrence of each subsequent time slot.

Clause 15. A method, comprising: providing an input data value to a pseudo random number generator to cause the pseudo random number generator to output a pseudo random output value; determine, using the pseudo random output value as an input to a pseudo random number generator, a preamble code; processing a data packet received using a first radio controller configured to communicate using a first communication protocol using the preamble code to generate a processed data packet; and determining a location of a device using the processed data packet.

Clause 16. The method of clause 15, further comprising receiving, using a second radio controller configured to communicate using a second communication protocol, a first configuration parameter, wherein the first configuration parameter indicates a mapping of pseudo random output values of the pseudo random number generator to preamble codes.

Clause 17. The method of clause 16, further comprising receiving, using the second radio controller, a second configuration parameter, wherein the second configuration parameter determines a configuration of the pseudo random number generator.

Clause 18. The method of clause 15, further comprising determining a current preamble hopping state value and the current preamble hopping state value is equal to the input data value to the pseudo random number generator.

Clause 19. The method of clause 18, wherein the first protocol subdivides communication operations into a plurality of sequential time slots and further comprising incrementing the preamble hopping state value upon an occurrence of each subsequent time slot.

Clause 20. The method of clause 15, further comprising: determining a first preamble code out of a plurality of preamble codes, wherein the plurality of preamble codes are determined by the first protocol; repeated using the first preamble code to attempt to decode messages received using the first radio controller; and upon successfully using the first preamble to decode a first message, determine a current preamble hopping state.

As will be appreciated by one skilled in the art, aspects of the present disclosure may be embodied as a system, process, method, and/or program product. Accordingly, various aspects of the present disclosure (e.g., localization device 102 or anchors 104 of FIG. 1) may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM"), a read-only memory ("ROM"), an erasable programmable read-only memory ("EPROM" or flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The block diagrams in the figures illustrate architecture, functionality, and operation of possible implementations of circuitry, systems, methods, processes, and program products according to various embodiments of the present disclosure. In this regard, certain blocks in the block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module, and achieve the stated purpose for the module. Indeed, a module of executable code may be a single instruction, or many instructions, and may even be distributed over several different code segments, among different programs, and across several memory devices. Similarly, operational data (e.g., knowledge bases of adapted weights and/or biases described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general-purpose computer, special purpose computer, or other programmable data processing apparatus (e.g., controller) to produce a machine, such that the instructions, which execute via the processor(s) of the computer or other programmable data processing apparatus, create circuitry or means for implementing the functions/acts specified in the block diagram block or blocks.

It will also be noted that each block of the block diagrams, and combinations of blocks in the block diagrams, can be implemented by special purpose hardware-based systems (e.g., which may include one or more graphics processing units) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, application specific ICs, microcontrollers, systems on a chip, general purpose processors, microprocessors, or the like.

Computer program code, i.e., instructions, for carrying out operations for aspects of the present disclosure may be written in any combination of one or more programming languages, including an object-oriented programming language such as Java, Smalltalk, Python, C++, or the like, conventional procedural programming languages, such as the "C" programming language or similar programming languages, or any of the machine learning software disclosed herein.

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the functions/acts specified in the block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer, other programmable apparatus, or other devices provide processes for implementing the functions/acts specified in the block diagram block or blocks.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed:

1. A system, comprising:
a plurality of ultra-wideband (UWB) anchors configured to broadcast UWB timing data in a plurality of data packets, wherein each data packet is associated with a preamble code; and
a device, including:
a first radio controller configured to communicate with the plurality of UWB anchors using a first protocol, wherein the first protocol subdivides communication operations into a plurality of sequential time slots;
a pseudo random number generator configured to generate a pseudo random output value based on an input data value; and
a processor configured to:
provide the input data value to the pseudo random number generator to cause the pseudo random number generator to output the pseudo random output value;
determine, using the pseudo random output value, the preamble code;
process at least one data packet of the plurality of data packets received using the first radio controller and from a first UWB anchor in the plurality of UWB anchors using the preamble code to generate a processed data packet;
determine a location of the device using the processed data packet; and
increment a preamble hopping state value upon an occurrence of each subsequent time slot; and wherein:
the device includes a second radio controller configured to communicate using a second protocol, wherein the second protocol is not a UWB communication protocol; and
the processor is configured to receive, using the second radio controller, a first configuration parameter, wherein the first configuration parameter indicates a mapping of pseudo random output values of the pseudo random number generator to preamble codes.

2. The system of claim 1, wherein the processor is configured to receive, using the second radio controller, a second configuration parameter, wherein the second configuration parameter determines a configuration of the pseudo random number generator.

3. The system of claim 1, wherein the processor is configured to determine a current preamble hopping state value and the preamble hopping state value is equal to the input data value to the pseudo random number generator.

4. The system of claim 1, wherein the first protocol subdivides communication operations into a plurality of sequential time slots.

5. The system of claim 1, wherein the processor is configured to determine a current preamble hopping state value and a preamble hopping state value is equal to the input data value to the pseudo random number generator.

6. A system, comprising:
a plurality of ultra-wideband (UWB) anchors configured to broadcast UWB timing data in a plurality of data packets, wherein each data packet is associated with a preamble code; and
a device, including:
a first radio controller configured to communicate with the plurality of UWB anchors using a first protocol;
a pseudo random number generator configured to generate a pseudo random output value based on an input data value; and
a processor configured to:
provide the input data value to the pseudo random number generator to cause the pseudo random number generator to output the pseudo random output value;
determine, using the pseudo random output value, the preamble code;
process at least one data packet of the plurality of data packets received using the first radio controller and from a first UWB anchor in the plurality of UWB anchors using the preamble code to generate a processed data packet; and
determine a location of the device using the processed data packet;
wherein when the device is not time synchronized to the plurality of UWB anchors and the processor is configured to:
determine a first preamble code out of a plurality of preamble codes, wherein the plurality of preamble codes is determined by the first protocol;
repeatedly use the first preamble code to attempt to decode ranging initiation messages or ranging synchronization messages received from the plurality of UWB anchors; and
upon successfully using the first preamble code to decode a first ranging initiation message or ranging synchronization message, determine a current preamble hopping state value of the plurality of UWB anchors.

7. The system of claim 6, wherein the first preamble code is a fixed value.

8. The system of claim 7, wherein the first preamble code is determined pseudo randomly.

9. The system of claim 6, wherein the processor is configured to determine the current preamble hopping state value and a preamble hopping state value is equal to the input data value to the pseudo random number generator.

10. A method, comprising:
providing an input data value to a pseudo random number generator to cause the pseudo random number generator to output a pseudo random output value;
determining, using the pseudo random output value as an input to the pseudo random number generator, a preamble code;

processing a data packet received using a first radio controller configured to communicate using a first communication protocol using the preamble code to generate a processed data packet, wherein the first protocol subdivides communication operations into a plurality of sequential time slots and further comprising incrementing the preamble hopping state value upon an occurrence of each subsequent time slot;

receiving, using a second radio controller configured to communicate using a second communication protocol, a first configuration parameter, wherein the first configuration parameter indicates a mapping of pseudo random output values of the pseudo random number generator to preamble codes; and determining a location of a device using the processed data packet.

11. The method of claim 10, further comprising receiving, using the second radio controller, a second configuration parameter, wherein the second configuration parameter determines a configuration of the pseudo random number generator.

12. The method of claim 10, further comprising determining a current preamble hopping state value and the current preamble hopping state value is equal to the input data value to the pseudo random number generator.

13. A method comprising:

providing an input data value to a pseudo random number generator to cause the pseudo random number generator to output a pseudo random output value;

determining, using the pseudo random output value as an input to the pseudo random number generator, a preamble code;

processing a data packet received using a first radio controller configured to communicate using a first communication protocol using the preamble code to generate a processed data packet, wherein the first protocol subdivides communication operations into a plurality of sequential time slots and further comprising incrementing the preamble hopping state value upon an occurrence of each subsequent time slot;

determining a first preamble code out of a plurality of preamble codes, wherein the plurality of preamble codes is determined by the first communication protocol;

repeatedly using the first preamble code to attempt to decode messages received using the first radio controller;

upon successfully using the first preamble code to decode a first message, determine a current preamble hopping state; and determining a location of a device using the processed data packet.

14. The method of claim 13, further comprising determining a current preamble hopping state value and the current preamble hopping state value is equal to the input data value to the pseudo random number generator.

15. A system, comprising:

a plurality of ultra-wideband (UWB) anchors configured to broadcast UWB timing data in a plurality of data packets, wherein each data packet is associated with a preamble code; and a device, including:

a first radio controller configured to communicate with the plurality of UWB anchors using a first protocol, wherein the first protocol subdivides communication operations into a plurality of sequential time slots;

a pseudo random number generator configured to generate a pseudo random output value based on an input data value; and a processor configured to:

provide the input data value to the pseudo random number generator to cause the pseudo random number generator to output the pseudo random output value;

determine, using the pseudo random output value, the preamble code;

process at least one data packet of the plurality of data packets received using the first radio controller and from a first UWB anchor in the plurality of UWB anchors using the preamble code to generate a processed data packet;

determine a location of the device using the processed data packet; and increment a preamble hopping state value upon an occurrence of each subsequent time slot;

wherein when the device is not time-synchronized to the plurality of UWB anchors and the processor is configured to:

determine a first preamble code out of a plurality of preamble codes, wherein the plurality of preamble codes is determined by the first protocol;

repeatedly use the first preamble code to attempt to decode ranging initiation messages or ranging synchronization messages received from the plurality of UWB anchors; and upon successfully using the first preamble code to decode a first ranging initiation message or ranging synchronization message, determine a current preamble hopping state value of the plurality of UWB anchors.

16. The system of claim 15, wherein the first preamble code is a fixed value.

17. The system of claim 16, wherein the first preamble code is determined pseudo randomly.

18. The system of claim 15, wherein the device includes a second radio controller configured to communicate using a second protocol, wherein the second protocol is not a UWB communication protocol.

19. The system of claim 18, wherein the processor is configured to receive, using the second radio controller, a first configuration parameter, wherein the first configuration parameter indicates a mapping of pseudo random output values of the pseudo random number generator to preamble codes.

* * * * *